United States Patent [19]

Kinoshita

[11] Patent Number: 5,051,553
[45] Date of Patent: Sep. 24, 1991

[54] APPARATUS FOR DETECTING A FAILURE IN AUTOMATIC WIRE EXTENSION

[75] Inventor: Hiroshi Kinoshita, Oshino, Japan

[73] Assignee: Fanuc Ltd., Minamitsuru, Japan

[21] Appl. No.: 490,608

[22] PCT Filed: Oct. 4, 1989

[86] PCT No.: PCT/JP89/01020

§ 371 Date: May 22, 1990

§ 102(e) Date: May 22, 1990

[87] PCT Pub. No.: WO90/03863

PCT Pub. Date: Apr. 19, 1990

[30] Foreign Application Priority Data

Oct. 8, 1988 [JP] Japan .................................. 1-252894

[51] Int. Cl.$^5$ ........................... B23H 7/02; B23H 7/10
[52] U.S. Cl. .................................................. 219/69.12
[58] Field of Search ................. 219/69.12, 69.13, 69.19

[56] References Cited

U.S. PATENT DOCUMENTS 4,814,572 3/1989 Aso et al. ........................ 219/69.12
4,816,636 3/1989 Obara et al. ..................... 219/69.12
4,877,935 10/1989 Aso et al. ......................... 219/69.12

FOREIGN PATENT DOCUMENTS 177234 10/1983 Japan .
196128 11/1984 Japan .................................. 219/69.12
120920 6/1987 Japan .................................. 219/69.12
162426 7/1987 Japan .
120032 5/1988 Japan .................................. 219/69.12

Primary Examiner—Geoffrey S. Evans
Attorney, Agent, or Firm—Staas & Halsey

[57] ABSTRACT

Detecting a failure in automatic wire extension in an electric discharge machine performing wire extension through a small-diameter machining initial hole by using a subnozzle attached to a main nozzle. During wire extension through a small-diameter initial hole, a voltage is applied to the input terminal of a first short-circuit detecting circuit (161) connected to a main nozzle (120) for normal wire extension, the first detecting circuit is connected to a control unit (170) through a logic circuit (166-169), and a second short-circuit detecting circuit (162) for detecting a short circuit between a wire (40) and a workpiece (50) is disconnected from the control unit. A failure in the wire extension is detected after the wire reaches the subnozzle (150), while permitting the wire to touch the machining initial hole (51). When the passing of the wire is blocked so that the wire touches the main nozzle, occurrence of a wire extension failure is detected in response to a signal from the first short-circuit detecting circuit whose the input terminal is grounded via the main nozzle and the wire.

6 Claims, 3 Drawing Sheets

APPARATUS FOR DETECTING A FAILURE IN AUTOMATIC WIRE EXTENSION

TECHNICAL FIELD

The present invention relates to an apparatus for detecting a failure in automatic wire extension of a wire cut electric discharge machine.

BACKGROUND ART

Wire cut electric discharge machines generally comprise upper and lower wire guides which are respectively disposed above and under a worktable for fixing a workpiece and are individually provided with a wire passage for guiding a wire electrode (hereinafter merely referred to as wire). These machines are arranged to produce an electric discharge between the wire and the workpiece, while running the wire previously inserted through the wire passages and a machining initial hole formed through the workpiece, to thereby carry out electric discharge machining, and are further arranged to inject a machining fluid from upper and lower nozzles, respectively provided at the upper and lower wire guides, toward an electric discharge machining region. When a disconnection of the wire occurs during the electric discharge machining or when the wire is intentionally cut upon completion of the machining for each product during the manufacture of a plurality of products from one workpiece, the electric discharge machines operate to extend the thus accidentally or intentionally disconnected wire between the two wire guides, by causing the wire to be fed through the upper wire guide while restraining the wire by the machining fluid jetted from a wire extension nozzle attached to the upper nozzle, thereby causing the wire to be inserted into the initial hole of the workpiece and then into the wire passage of the lower wire guide.

In case that such automatic wire extension is carried out successfully, the wire does not touch the workpiece during the wire extension until it reaches the lower wire guide. On the other hand, when the wire insertion to the initial hole or to the lower guide is blocked and thus the wire extension ends in failure for the reason, for instance, that a burr exists in the inner peripheral surface of the initial hole or sludge is accumulated in the wire passage of the lower wire guide, the wire is flexed and touches the workpiece. In this respect, conventionally, the automatic wire extension is performed with a predetermined voltage applied to the wire, and this wire voltage is monitored, so as to determine an occurrence of a failure of the wire extension when the wire touches the workpiece which is grounded, namely, a short circuit occurs between the two, and accordingly the wire voltage is dropped to the ground potential. When such a wire extension failure occurs, a similar wire extension operation is repeatedly carried out, and if the wire extension still fails despite a predetermined number of times of wire extension, the wire is extended through another initial hole.

In case that the wire extension is performed through an initial hole with a relatively large diameter suitable for manufacture of ordinary products, the wire extension can be achieved at a practically satisfactory rate. On the other hand, when the wire extension is effected through a small-diameter initial hole suitable for manufacture of products requiring extremely precise machining, such as lead frames of integrated circuits, the chance of succeeding in the wire extension is lowered.

In view of this, the applicants hereof proposed a novel wire extension method (Japanese Patent Application No. 63-252893), wherein when carrying out a normal wire extension through an initial hole having a normal diameter, the wire electrode is fed while the machining fluid is injected to the workpiece from a main nozzle positioned at a predetermined distance from the workpiece, and when carrying out a specific wire extension through a small-diameter initial hole, a subnozzle having a nozzle hole diameter smaller than the small diameter of the initial hole is attached to the main nozzle, and the wire electrode is fed with the subnozzle positioned closer to the workpiece and with the injection of the machining fluid interrupted. According to the wire extension method of this type, the wire is more likely to touch the workpiece when inserted through the machining initial hole, and therefore, a wire extension failure cannot be accurately detected by the aforementioned type of wire extension failure detecting method in which the presence/absence of short circuit between the wire and the workpiece is monitored. As a result, the retry function of the electric discharge machine to retry the wire extension upon occurrence of a wire extension failure cannot be effectively used.

DISCLOSURE OF THE INVENTION

An object of the present invention is to provide an apparatus for detecting a failure in automatic wire extension, which is installed in a wire cut electric discharge machine for automatically carrying out wire extension through a small-diameter machining initial hole by using a subnozzle attached to a main nozzle.

According to the present invention, an apparatus for detecting a failure in automatic wire extension, installed in a wire cut electric discharge machine, comprises: a short-circuit detecting circuit for generating a predetermined detection output when a short circuit occurs between a wire electrode and a main nozzle during execution of wire extension through a machining initial hole having a small diameter by use of a subnozzle mounted to the main nozzle and electrically insulated therefrom; disabling means for disabling the short-circuit detecting circuit to render the predetermined detection output therefrom ineffective after the start of the wire extension until the wire electrode reaches a predetermined delivery position; and discrimination means for determining that the wire extension ended in failure when the predetermined detection output is generated by the short-circuit detecting circuit after the short-circuit detecting circuit is released from a disabled state.

Preferably, the wire cut electric discharge machine is arranged to carry out a second wire extension through a machining initial hole having a normal diameter by using the main nozzle; and the discrimination means determines whether the first-mentioned wire extension or the second wire extension is being executed. The automatic wire extension failure detecting apparatus further includes a second short-circuit detecting circuit for generating a second predetermined detection output when a short circuit occurs between the wire electrode and a workpiece during execution of the second wire extension, and the discrimination means determines that the wire extension ended in failure when the second predetermined detection output is generated.

As described above, according to the present invention, the unsuccessful wire extension is determined when the predetermined detection output representing a short circuit between the wire electrode and the main nozzle is generated by the short-circuit detecting circuit after the wire electrode reaches the predetermined delivery position after the start of the wire extension through a small-diameter machining initial hole by the use of the subnozzle attached to the main nozzle and electrically insulated therefrom. Therefore, the determination of wire extension failure is not adversely affected even when the wire electrode touches the workpiece, and a wire extension failure can be accurately detected even at the time of wire extension through a small-diameter machining initial hole. Consequently, the retry function of the electric discharge machine to retry the wire extension, which is based on the determination of wire extension failure, can be effectively used, thus enabling a continuous operation of the electric discharge machine. Preferably, a failure in the wire extension through a machining initial hole having a normal diameter can also be detected, and accordingly, a wire extension failure detecting apparatus suited to general applications can be provided.

BEST MODE OF CARRYING OUT THE INVENTION

Referring to FIGS. 1 through 4, a wire cut electric discharge machine to which an apparatus for detecting a failure in automatic wire extension according to a first embodiment of the present invention is mounted, comprises a Z axis unit 10 mounted to an upper column (not shown) in a manner vertically movable relative thereto, and a UV axis unit 20 mounted to the Z axis unit 10 so as to be vertically movable in unison therewith and horizontally movable relative thereto. An upper wire guide 30 is mounted to the unit 20 for movement in unison therewith.

Figure 1:
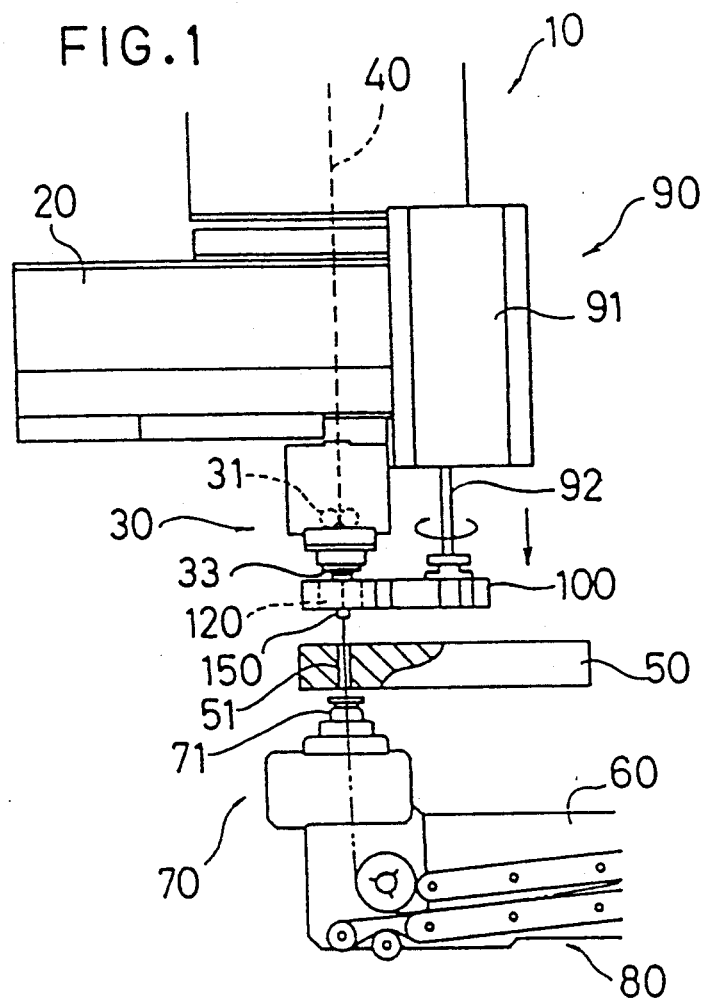
FIG. 1 is a fragmentary schematic front view of a principal part of a wire cut electric discharge machine to which an apparatus for detecting a failure in automatic wire extension is mounted.
Figure 2:
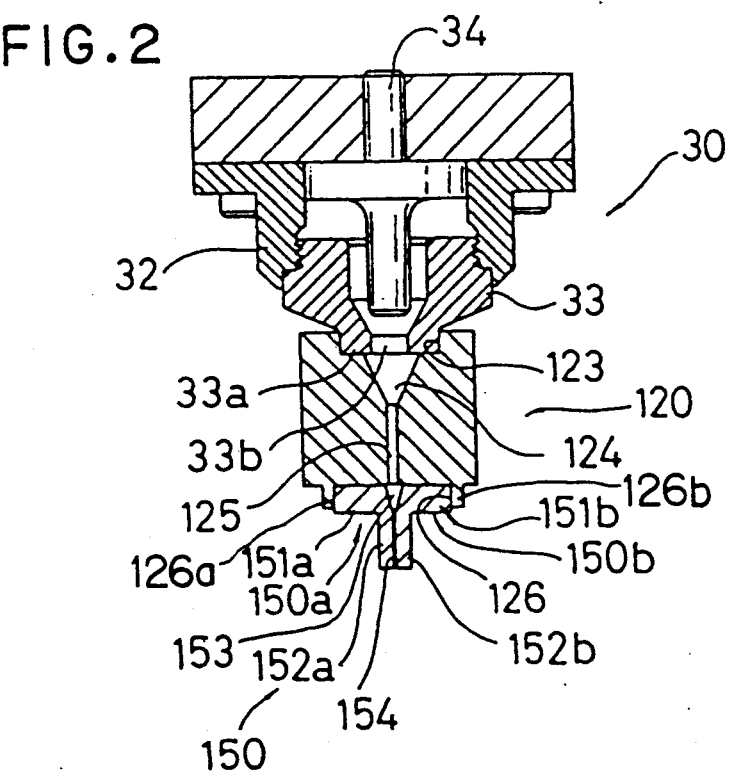
FIG. 2 is a longitudinal sectional view of a principal part of an upper wire guide of the electric discharge machine in FIG. 1, with a subnozzle mounted to the upper wire guide.

The upper wire guide 30 is, as a whole, formed into a hollow cylinder, and accommodates therein a pair of hold rollers 31 for holding a wire electrode (hereinafter referred to as wire) therebetween and feeding same downward during a wire extension operation, mentioned later. The hold rollers 31 are arranged to be movable toward and away from each other, and are coupled together through a one-way clutch (not shown) which is engaged when the rollers rotate in wire feed directions. As shown in FIG. 2, the upper wire guide 30 is provided at a lower portion thereof with an annular holder 32 into which an upper nozzle 33 and a die guide 34 having a wire passage (not shown) bored therethrough are fitted, these elements 32-34 being disposed in alignment with one another. Supplied to the upper wire guide 30 through a pipe (not shown) is a machining fluid, which is then injected toward a workpiece 50 fixed on a worktable (not shown) through the wire passage of the die guide 34 and the upper nozzle 33.

The electric discharge machine further comprises a lower wire guide 70 secured to a lower column 60 under the worktable. The lower wire guide 70 has a lower nozzle 71 at an inner end thereof and accommodates therein a three-point support guide (not shown), which is arranged in alignment with the upper nozzle 33 and the die guide 34 accommodated in the nozzle 33. At the downstream side of the lower wire guide 70 is disposed a belt type wire conveying device 80 composed of a pair of belts, which are movable toward and away from each other and are adapted to travel while being urged against each other with the wire 40 therebetween during automatic wire extension, to thereby convey the wire.

Figure 3:
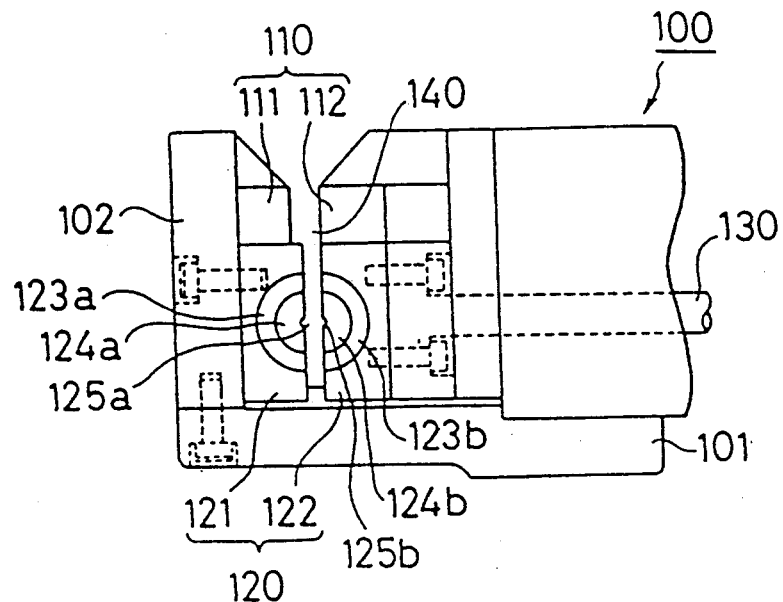
FIG. 3 is a fragmentary plan view of a portion of an arm assembly of an automatic wire extension unit shown in FIG. 1.

The electric discharge machine is further provided with an automatic wire extension unit 90 having a housing 91 which is secured to the UV axis unit 20 and to which a motor and a first piston-cylinder assembly (neither is shown) are mounted. A rod 92, which is rotatable in unison with the rotary shaft of the motor and axially movable relative thereto, has a lower end to which one end portion of an arm assembly 100 is secured, so that the arm assembly 100 is swung by the motor and moved vertically by the first piston-cylinder assembly. As shown in FIG. 3, a wire cutting unit 110 comprising a stationary cutter 111 and a movable cutter 112 is provided the outer side of the other end portion of the arm assembly 100 in the width direction of the assembly. A wire extension nozzle 120 comprising a stationary nozzle portion 121 and a movable nozzle portion 122 is provided at the inner side of same in the assembly width direction.

More specifically, the stationary cutter 111 is secured to a frame member 102 which is detachably fixed to one end of the arm assembly body 101 by bolts, and the movable cutter 112 is secured to the distal end of a piston rod of a second piston-cylinder assembly (not shown) secured to the main body 101, such that, as the piston reciprocates, the movable cutter 112 is moved toward and away from the stationary cutter 111 together with the piston rod. The stationary nozzle portion 121 is detachably fixed to the frame member 102 by bolts, and the movable nozzle portion 122 is detachably fixed by bolts to the distal end of a piston rod 130 of a third piston-cylinder assembly secured to the assembly body 101, so that, as the piston reciprocates, the movable nozzle portion 122 is moved toward and away from the stationary nozzle portion 121 in unison with the piston rod 130. The cutters 111, 112 and the nozzle portions 121, 122 are so arranged that when they are set apart from their counterparts, a slit 140 is defined between the opposed faces of these elements to allow the wire 40 to be passed therethrough. Further, the nozzle portions 121, 122 are formed at their opposed surfaces thereof with semicylindrical holes, inverted semi-conical holes, small-diameter semicylindrical holes, and semicylindrical holes in the mentioned order from top to bottom, so as to define a cylindrical hole 123 into which an annular end 33a of the upper nozzle 33 is closely fitted, an inverted-cone shaped hole 124 communicating with a nozzle hole 33b of the upper nozzle 33, a nozzle hole 125 communicating with the hole 124, and a recess 126 into which a subnozzle 150 mentioned later is fitted, when the movable nozzle portion 122 is brought in contact with the stationary nozzle portion 121.

The subnozzle 150 is electrically insulated from the main nozzle 120 and is made of an insulating material such as ceramic or the like. The subnozzle 150 is composed of two separate halves 150a and 150b, symmetrical with each other respect to a plane passing the axis of the subnozzle and each consisting of a semicylindrical main portion 151a, 151b and a semicylindrical extension 152a, 152b formed integrally and coaxially with the main portion. The subnozzle halves 150a, 150b are detachably fixed to the nozzle halves 121, 122 of the main nozzle 120, respectively, by appropriate means (not shown), so that, when the subnozzle halves 150a, 150b are joined together, the joined main portions 151a, 151b is fitted into the recess 126 of the main nozzle 120, and one subnozzle half 150b is movable in unison with the movable nozzle portion 122. The subnozzle halves 150a, 150b are each formed at opposed faces with an inverted semi-conical hole, opening in the upper surface of the main portion 151a, 151b, and a small-diameter semicylindrical hole, communicating at one end with the inverted semi-conical hole and opening at the other end in the lower surface of the extension 152a, 152b. When the subnozzle 150 is fitted into the main nozzle 120, with the subnozzle halves 150a, 150b joined together, an inverted cone-like hole 153 and a small-diameter cylindrical subnozzle hole 154 are defined in alignment with the axis of the subnozzle, which is coaxial with the nozzle hole 33b of the upper nozzle 33. The diameter of the hole 153 is 1.5 mm, for example, at the upper surface of the subnozzle, and the diameter of the same hole 153 at the extension side and the diameter of the hole 154 are 0.3 mm, for example.

The electric discharge machine further includes a numerical control unit 170 constituting a part of a wire extension failure detecting apparatus 160 described later. The control unit 170 is connected to various operating parts of the electric discharge machine, such as respective power sources (e.g., motor, piston-cylinder assembly, etc.) of the movable portions of the Z axis unit 10, UV axis unit 20, hold rollers 31, wiretable, movable sections of the three-point support guide, wire conveying device 80 and automatic wire extension unit 90, and is connected to an electric discharge power supply, a machining fluid supply system, and a sensor system.

Figure 4:
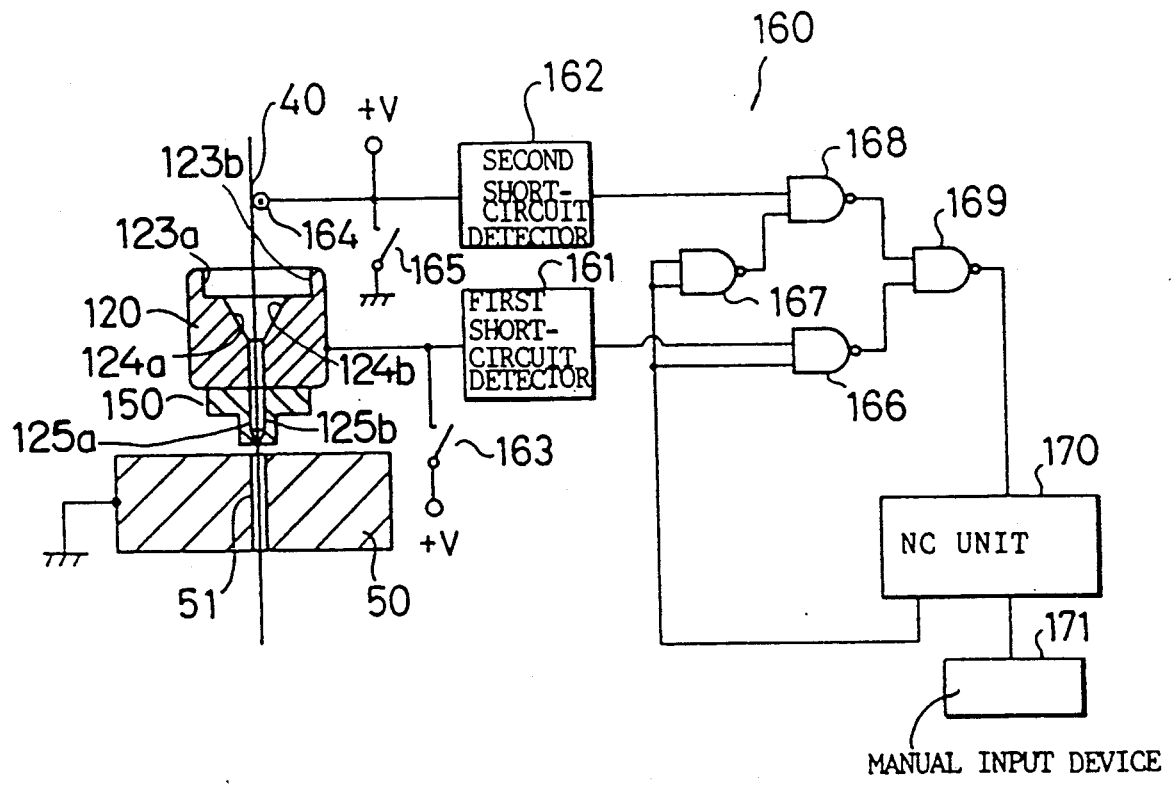
FIG. 4 is a diagram showing an apparatus for detecting a failure in automatic wire extension according to a first embodiment of the present invention.

With reference to FIG. 4, the apparatus for detecting a failure in automatic wire extension, which forms an essential part of the present invention, will be now described.

The wire extension failure detecting apparatus 160 is operable in a first detection mode for detecting a wire extension failure when carrying out a wire extension through a small-diameter machining initial hole 51 by using the main nozzle 120 and the subnozzle 150 in combination, and a second detection mode for detecting a wire extension failure when carrying out a wire extension through a machining initial hole 51 with a normal diameter by using the main nozzle 120 alone. To this end, the detecting apparatus 160 is provided with first and second short-circuit detecting circuits 161 and 162 of conventionally known type, including comparators and the like, and the numerical control unit 170 which has the function of discriminating between the detection modes and determining the success/failure of the wire extension, in addition to the conventionally known function of controlling the various operating parts of the electric discharge machine.

The input terminal of the first short-circuit detecting circuit 161 is connected to a DC voltage source $+V$ of a predetermined voltage, e.g., 10 V, through a first relay contact 163, and also connected to the main nozzle 120 which is electrically conductive. The input terminal of the second short-circuit detecting circuit 162 is connected to the same voltage source $+V$ and also to the wire 40 through a contactor 164. The connection node between the second short-circuit detecting circuit 162 and the voltage source $+V$ is grounded through a second relay contact 165. Further, the output terminal of the first short-circuit detecting circuit 161 is connected to one input terminal of a first NAND circuit 166 whose another input terminal and both input terminals of a second NAND circuit 167 are connected to a computer (not shown) accommodated in the numerical control unit 170 through an output circuit (not shown) accommodated in the this unit. The output terminal of the second short-circuit detecting circuit 162 is connected to one input terminal of a third NAND circuit 168, the other input terminal of which is connected to the output terminal of the second NAND circuit 167. The output terminal of the third NAND circuit 168 is connected to one input terminal of a fourth NAND circuit 169. Moreover, the other input terminal of the fourth NAND circuit 169 is connected to the output terminal of the first NAND circuit 166, and the output terminal of the circuit 169 is connected to the aforesaid computer through an input circuit (not shown) accommodated in the numerical control unit 170.

Reference numeral 171 denotes a manual operation means for the selection of a detection mode, which comprises, for example, a manual data input device ordinarily provided in the numerical control unit 170 and connected to the computer through the input circuit. The computer is arranged to store flag information representing the selected detection mode in a predetermined register when a detection mode is selected by an operator by operating the manual data input device 171. Further, the computer is so arranged as to apply a detection mode select control output, through the output circuit, to driving coils of relays (not shown) respectively including the first and second relay contacts 163, 165, and to one input terminal of the first NAND circuit 166, when it reads, from an electric discharge machining program (not shown), a predetermined command to start a process for detecting a failure in wire extension. The select control output is also applied to one input terminal of the third NAND circuit 168 after it is inverted by the second NAND circuit 167. The workpiece 50 is grounded.

Operation of the wire cut electric discharge machine having the above construction will now be described.

During an electric discharge machining operation, an electric discharge is produced between the wire 40 and the workpiece 50 while the wire 40 is caused to travel by the wire feeding device, not shown, with the arm assembly 100 of the automatic wire extension unit 90 retracted sideways, and the machining fluid is injected from the upper and lower nozzles 33 and 71 toward the electric discharge machining region.

In the case of manufacturing a plurality of products from a single workpiece 50, the wire 40 is cut every time the electric discharge machining is completed for one product, and then a wire extension is carried out in a mode according to the diameter of the machining initial hole 51 (FIG. 1) into which the wire 40 is to be inserted next. First, a normal wire extension through a machining initial hole having a normal diameter, e.g., 2 mm or more, which is executed for producing an ordinary product not requiring extremely precise machining or the like, will be described. In this case, the operator selects the second detection mode by operating the manual data input device 171.

When the electric discharge machining for one product is finished, the various operating parts of the electric discharge machine are sequentially operated as described below, in accordance with various control outputs from the numerical control unit 170.

First, the operation of the machining fluid supply system and wire conveying device is stopped, thereby interrupting the supply of the machining fluid and the feeding of the wire. Subsequently, the Z axis unit 10 is raised to move the upper wire guide 30 upward, and a pair of hold rollers 31 are driven to approach each other so as to hold the wire 40 therebetween. The arm assembly 100, which is in a retracted position, is lowered by the first piston-cylinder assembly via the rod 92 of the automatic wire extension unit 90, and then swung by the motor until the cutters 111, 112 come to a position just under the upper nozzle 33, whereby the wire 40 is introduced between the cutters 111 and 112 through the slit 140. Next, the movable cutter 112 is driven by the second piston-cylinder assembly, to cut the wire 40. After the arm assembly 100 is swung back toward the retracted position, the downstream side portion of the wire 40 is held between a pair of belts of the wire conveying device 80, and then, the same device 80 and a wire feed roller (not shown) are driven to discard the wire in a wire recovery container (not shown).

Subsequently, the worktable is moved in a horizontal plane to a position where the center of the machining initial hole 51, which is bored through the workpiece 50 and into which the wire 40 is to be inserted, is aligned with the axes of the upper and lower wire guides 30 and 70. The arm assembly 100 is again swung toward the upper wire guide, to bring the main nozzle 120 to a position just under the upper nozzle 33. Next, the third piston-cylinder assembly is driven to bring the movable nozzle portion 122 into contact with the stationary nozzle portion 121, and with the wire 40 held in the nozzle hole 125 defined by these two nozzle portions, the arm assembly 100 is raised such that the cylindrical hole 123 in the upper surface of the main nozzle receives the annular end 33a of the upper nozzle 33. Simultaneously, a movable piece (not shown) of the three-point support guide is moved away from a stationary piece of same (not shown), thus permitting the insertion of the wire 40. The Z axis unit 10 is then lowered until the distance between the extreme end face of the main nozzle 120 and the upper surface of the workpiece 50 becomes equal to a predetermined value (11 to 13 mm) suited to a normal automatic wire extension.

At this stage, the computer of the numerical control unit 170 reads a command to detect a wire extension failure, and applies an L-level detection mode select control output to the first and second NAND circuits 166, 167 and the two relays, in accordance with the flag information representing the detection mode set by the aforementioned detection mode-setting operation of the operator. As a result, the first NAND circuit 166 is disabled, and the third and fourth NAND circuits 168 and 169 are enabled. Further, the first and second relay contacts 163, 165 are opened, whereby a voltage of 10 V is applied from the voltage source +V to the wire 40 and the input terminal of the second short-circuit detecting circuit 162 via the contactor 164, while the application of the voltage to the main nozzle 120 is interrupted.

Under the above conditions, while the machining fluid is injected from the upper nozzle 33, the hold rollers 31 are rotated to feed the wire 40 toward the machining initial hole 51 and the lower wire guide 70. Usually, the wire 40, restrained by the jet of the machining fluid, passes through the machining initial hole 51 and then through the wire passage of the three-point support guide and between the stationary piece and movable piece of same, to the wire feed roller via the wire conveying device 80, thus completing a wire extension process. Since during a normal wire extension the wire 40 does not touch the workpiece 50, a voltage of 10 V is continuously applied to the input terminal of the second short-circuit detecting circuit 162 and accordingly an H-level signal is continuously supplied to the third NAND circuit 168 from the circuit 162. Therefore, an H-level signal representing nonoccurrence of a short circuit between the wire 40 and the workpiece 50 (i.e., wire extension failure) is continuously supplied to the numerical control unit 170 from the fourth NAND circuit 169.

Subsequently, after interrupting the supply of the machining fluid and stopping the rotation of the hold roller pair 31, the upper wire guide 30 is raised together with the Z axis unit 10. At this time, the one-way clutch provided between the two hold rollers 31 is disengaged and thus the hold rollers 31 run idle. The arm assembly 100 is then lowered and the wire extension nozzle 120 is detached from the upper nozzle 33. Next, with the movable nozzle portion 122 and the stationary nozzle portion 121 set apart from each other to permit passage of the wire 40 therebetween, the arm assembly 100 is swung back and then is raised up to the retracted position. Simultaneously with this, the movable piece of the three-point support guide is driven toward the stationary piece thereof to slidably hold the wire 40 therebetween, and the hold rollers 31 and the belts of the wire conveying device 80 are driven in a direction such that they are moved away from their counterparts, thereby releasing the wire 40 from the rollers and the belts. Finally, the upper wire guide 30 is lowered to a predetermined height for preparation of an electric discharge machining operation.

When a failure occurs in wire extension, a short circuit is caused between the wire and the workpiece 50, and thus the wire 40 is grounded via the workpiece 50, causing a drop of the voltage at the input terminal of the short-circuit detecting circuit 162 to 0 V. In this case, an L-level signal representing the occurrence of a wire extension failure is supplied to the numerical control unit 170 from the fourth NAND circuit 169. Upon receiving this failure detection signal, the computer of the numerical control unit repeats the aforementioned operation procedure to retry the wire extension.

Next, operation of the electric discharge machine will be described referring to the case of a specific wire extension through a machining initial hole having a small diameter, e.g., 0.5 to 2 mm, which is executed for producing specific products requiring extremely precise machining, etc. In this case, the operator previously selects the first detection mode by operating the manual data input device 171, and sets the setting value for the distance between the distal end face of the subnozzle 150 and the upper surface of the workpiece 50 to 0.1 to 0.2 mm, which value is referred to by the computer of the numerical control unit 170 when the Z axis unit 10 is moved for height control.

To carry out the wire extension, the related parts of the electric discharge machine are operated in accordance with basically the same procedure as that in the case of the normal wire extension already described. However, in this case, prior to the execution of the wire extension, the subnozzle 150 is previously attached to the bottom of the main nozzle 120, and the machining fluid is not supplied for the wire extension.

Thereafter, the computer of the numerical control unit 170 reads the command to start the wire extension failure detection, and applies an H-level detection mode select control output to the first and second NAND circuits 166 and 167 and the two relays, in accordance with the flag information representing the detection mode set by the aforesaid mode setting operation of the operator. As a result, the second NAND circuit 167 is disabled, the first and fourth NAND circuits 166 and 169 are enabled, and the first and second relay contacts 163, 165 are closed, whereby the application of the voltage to the wire 40 and the input terminal of the second short-circuit detecting circuit 162 from the voltage source +V is interrupted, while a voltage of 10 V is applied to the main nozzle 120 from the voltage source +V.

Under these conditions, the hold rollers 31 are rotated to feed the wire of 0.2 mm in diameter, for example, toward the machining initial hole 51 having a small diameter (e.g., 0.5 to 2 mm) through the main nozzle 120 fitted onto the upper nozzle 33 and through the subnozzle 150 having a nozzle hole diameter of, for example, 0.3 mm, thereby starting a substantial wire extension.

When the substantial wire extension is started, the computer starts detecting a wire extension failure in the first detection mode according to the flag information representing the detection mode and in accordance with the wire extension failure detection start command. First, the computer starts a timer (e.g., a software timer using a program), in which a predetermined time has been set. The predetermined time is set at a value slightly longer than a time period which is normally required for the wire 40 to reach a predetermined wire position (in this embodiment, the inlet of the subnozzle hole 154 of the subnozzle 150) from the time the substantial wire extension is started and which is previously calculated based on the distance between the position of the leading end of the wire at the time of starting the substantial wire extension and the predetermined wire position and the wire feed speed.

When the wire is fed toward the small-diameter initial hole 51 through the main nozzle 120 and the subnozzle 150, since the distance between the nozzle 150 and the workpiece 50 is as small as 0.1 to 0.2 mm, usually the wire 40 can be smoothly inserted into the initial hole 51 without striking against the upper surface of the workpiece, even when the leading end of the wire is deflected due to the presence of liability to coil up. As the wire 40 is further fed toward the lower wire guide 70 thereafter, it is passed through the wire passage of the lower nozzle 71, the wire passage of the three-point support guide accommodated in the lower wire guide 70, and between the movable and stationary pieces of the same guide, without any difficulty despite the liability of the wire to coil up, due to the wire guiding effect of the small-diameter machining initial hole 51. Then, the above-described post-processing is executed for preparation of an electric discharge machining operation.

During the normal wire extension described above, an occurrence of a wire extension failure is determined by the wire extension failure detecting apparatus 160 in the following manner. Before the lapse of the preset time period, which is set in the timer and is slightly longer than the time normally required for the wire 40 to reach the inlet of the nozzle hole 154 of the subnozzle 150 from an instant at which the feeding of the wire 40 from the nozzle hole 125 of the main nozzle 120 is initiated, the computer ignores the detection output from the fourth NAND circuit 169 and makes no determination of wire extension failure based on the level of the same detection output. Accordingly, even when the wire 40 fed from the main nozzle 120 touches the inner peripheral surface of the nozzle hole 125 of the main nozzle so that a voltage of 0 V appears at the input terminal of the first short-circuit detecting circuit 161 which is connected to the ground potential through the main nozzle 120, the wire 40, the contactor 164, and the relay contact 165, and the resultant L-level output representing an unsuccessful wire extension is applied to the computer from the fourth NAND circuit 169, such an output representing a wire extension failure is ignored.

Thereafter, the determination of wire extension failure based on the presence/absence of contact between the wire 40 and the main nozzle 120 is started. To be noted, the wire 40 is slidably supported by the subnozzle 150 made of an electrically insulating material and is electrically insulated from the main nozzle 120 connected to the input terminal of the first short-circuit detecting circuit 161. Accordingly, even when the wire 40 is inserted into the machining initial hole 51 and touches its inner peripheral surface, a voltage of 10 V still appears at the input terminal of the first short-circuit detecting circuit 161, and therefore, an erroneous detection of the occurrence of wire extension failure never occurs. During the normal wire extension, the wire 40 is inserted into the lower wire guide 70 without being flexed, and during this process, the output of the fourth NAND circuit 169 is maintained at the H-level and hence the computer determines that the wire extension is being executed normally.

On the other hand, if the wire 40 is flexed when the wire is fed from the main nozzle 120 to the subnozzle 159 for the reason that the nozzle hole 154 of the subnozzle 150 is clogged, for instance, so that the wire may remain touching the main nozzle 120 even after the lapse of the predetermined time period set in the timer, the input terminal of the first short-circuit detecting circuit 161 is connected to the ground potential through the main nozzle 120, the wire 40, the contactor 164 and the second relay contact 165, as well as through the main nozzle 120, the wire 40 and the workpiece 50. As a result, a voltage of 0 V appears at the input terminal of the first short-circuit detecting circuit 161 and the resultant L-level signal is applied from the output terminal thereof to the input terminal of the first NAND circuit 166. Accordingly, an L-level signal indicative of unsuccessful wire extension is supplied from the fourth NAND circuit 169 to the computer, which then determines that a wire extension failure has occurred. Further, if an abnormal condition exists in various wire insertion sections, for example, a burr exists in the machining initial hole 51 or sludge is stored in the wire passage of the lower nozzle 71, the passing of the wire 40 is blocked. In this case, the wire 40 is flexed and finally touches the main nozzle 120, and the occurrence of such wire extension failure is detected in the above-described manner.

When the wire 40 is disconnected by accident during an electric discharge machining operation, automatic wire extension is executed as in the case of intentional cutting of the wire 40. In this case, upon detecting a wire disconnection in a conventional manner, the downstream side portion of the disconnected wire 40 is discarded, and then, the arm assembly 100 is moved to the position for wire extension, shown in FIG. 1, following the aforementioned procedure. The worktable is then driven such that the center of the initial hole 51 associated with machining during which the disconnection of the wire occurred, is brought into alignment with the axes of the upper nozzle 33 and of a corresponding one or both of the main nozzle 120 and the subnozzle 150. Subsequently, the wire extension is carried out, accompanied by the determination of presence/absence of unsuccessful wire extension effected by the same procedure as that mentioned above. These operations on this occasion are apparent from the foregoing description, and hence explanation thereof will be omitted.

When switching is made from the specific wire extension mode using the small-diameter initial hole to the aforesaid normal wire extension mode using the normal-diameter initial hole, the subnozzle 150 is detached from the main nozzle 120 in advance.

Figure 5:
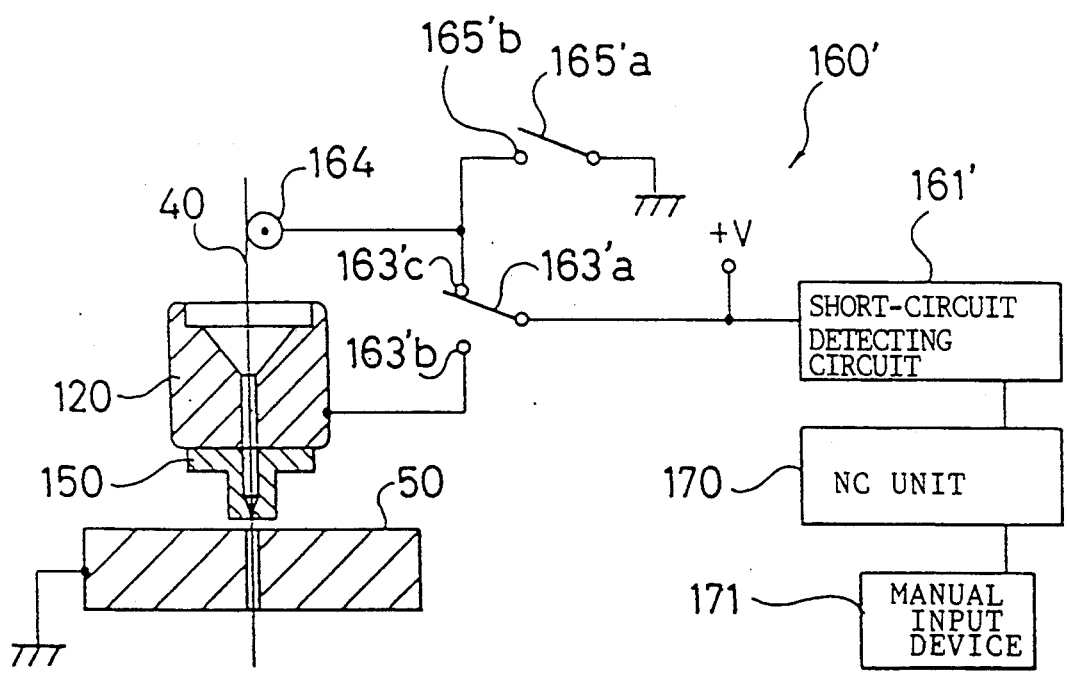
FIG. 5 is a diagram showing an apparatus for detecting a failure in automatic wire extension according to a second embodiment of the present invention.

With reference to FIG. 5, an apparatus for detecting a failure in automatic wire extension according to a second embodiment of the invention will be now described.

As compared with the detecting apparatus 160 of FIG. 4 including the first and second short-circuit detecting circuits 161, 162 and the logic circuits provided between these detecting circuits and the NC unit 170, a detecting apparatus 160' according to this embodiment is different in that it uses a single short-circuit detecting circuit 161' to attain a simplified arrangement.

Specifically, the input terminal of the short-circuit detecting circuit 161' is connected to a DC power supply +V and a movable contact 163'a of a first relay. The movable contact 163'a is arranged to be selectively connected to a first stationary contact 163'b of the first relay connected to the main nozzle 120, or a second stationary contact 163'c connected to a contactor 164 and a stationary contact 165'b of a second relay. The movable contact of the second relay is grounded.

Like the detecting apparatus 160 of FIG. 4, the detecting apparatus 160' shown in FIG. 5 is operated in either of the first detection mode for detecting an unsuccessful wire extension during a wire extension operation using the main nozzle 120 and the subnozzle 150 in combination, and the second detection mode for detecting an unsuccessful wire extension during wire extension using only the main nozzle 120. In the first detection mode, in accordance with a detection mode select command from the NC unit 170, the movable contact 163'a of the first relay is connected to the first stationary contact 163'b, and the movable contact 165'a of the second relay is connected to the stationary contact 165'b to thereby connect the contactor 164 to the ground potential. In the second detection mode, the movable contact 163'a of the first relay is connected to the second stationary contact 163'c, and the movable contact 165'a of the second relay is disconnected from the stationary contact 165'b. The detecting apparatus 160' is operated similarly to the aforementioned detecting apparatus 160 in other respects, and therefore, explanations thereof are omitted.

What is claimed is:

1. An apparatus for detecting a failure in automatic wire extension, installed in a wire cut electric discharge machine, comprising:
   a short-circuit detecting circuit for generating a predetermined detection output when a short circuit occurs between a wire electrode and a main nozzle during execution of wire extension through a machining initial hole having a small diameter by use of a subnozzle mounted to the main nozzle and electrically insulated therefrom;
   disabling means for disabling the short-circuit detecting circuit to render the predetermined detection output therefrom ineffective after the start of the wire extension until the wire electrode reaches a predetermined delivery position; and
   discrimination means for determining that the wire extension ended in failure when the predetermined detection output is generated by the short-circuit detecting circuit after the short-circuit detecting circuit is released from a disabled state.

2. An apparatus for detecting a failure in automatic wire extension according to claim 1, including:
   a voltage source connected to an input side of the short-circuit detecting circuit.

3. An apparatus for detecting a failure in automatic wire extension according to claim 2, including:
   a first switch for connecting the voltage source and the input side of the short-circuit detecting circuit to one of the main nozzle and the wire electrode; and
   a second switch for selectively causing the wire electrode to be grounded;
   wherein said wire cut electric discharge machine is operable to carry out a second wire extension through a machining initial hole having a normal diameter by using the main nozzle; and
   said discrimination means being arranged to determine whether the first-mentioned wire extension or said second wire extension is being executed, and control operated positions of the first and second switches in dependence on results of the determination.

4. An apparatus for detecting a failure in automatic wire extension according to claim 1, wherein said wire cut electric discharge machine is operable to carry out a second wire extension through a machining initial hole having a normal diameter by using the main nozzle;
   said discrimination means being arranged to determine whether the first-mentioned wire extension or said second wire extension is being executed;
   said wire extension failure detecting apparatus further including a second short-circuit detecting circuit for generating a second predetermined detection output when a short circuit occurs between the wire electrode and a workpiece during execution of the second wire extension; and
   said discrimination means being arranged to determine that the wire extension ended in failure when the second predetermined detection output is generated.

5. An apparatus for detecting a failure in automatic wire extension according to claim 4, including:
  a voltage source connected to an input side of the first-mentioned short-circuit detecting circuit and an input side of said second short-circuit detecting circuit.

6. An apparatus for detecting a failure in automatic wire extension according to claim 5, including:
  a first switch interposed between the voltage source and the input side of the first-mentioned short-circuit detecting circuit;
  a second switch having one end connected to a connection node between the voltage source and the input side of the second short-circuit detecting circuit, and having another end grounded; and
  a logic circuit interposed between the discrimination means and the first and second short-circuit detecting means; and
  said discrimination means being arranged to control operated positions of the first and second switches and operation of the logic circuit, depending on whether the first-mentioned wire extension or the second wire extension is being executed.

* * * * *

UNITED STATES PATENT AND TRADEMARK OFFICE
CERTIFICATE OF CORRECTION

PATENT NO. : 5,051,553
DATED : SEPTEMBER 24, 1991
INVENTOR(S) : HIROSHI KINOSHITA

It is certified that error appears in the above-identified patent and that said Letters Patent is hereby corrected as shown below:

TITLE PAGE [56] ABSTRACT,
    line 1, "Detecting" should be --An apparatus for detecting--; and
    "in an" should be --for use in an--;
    line 7, "(161)" should be deleted;
    line 8, "(120)" should be deleted;
    line 9, "(170)" should be deleted;
    line 10, "(166-169)" should be deleted;
    line 11, "(162)" should be deleted;
    line 12, "(40)" should be deleted; and "workpiece (50) is" should be --workpiece,--;
    line 14, "(150)" should be deleted;
    line 16, "(51)" should be deleted;
    line 19, "the" (second occurrence) should be deleted.

Col. 1, line 11, "com-" should be deleted;
    line 12, "prise" should be --include--;
    line 38, "In case that" should be --When--;
    line 42, "blocked and thus" should be --blocked,--;
    line 60, "In case that" should be --When--.

Col. 2, line 3, "wherein" should be --wherein,--;
    line 22, "machine" should be --machine, i.e.,--;
    line 24, "failure" should be --failure,--;
    line 26, "DISCLOSURE" should be --SUMMARY--;
    line 35, "comprises" should be --includes--.

UNITED STATES PATENT AND TRADEMARK OFFICE
CERTIFICATE OF CORRECTION

PATENT NO. : 5,051,553
DATED : SEPTEMBER 24, 1991
INVENTOR(S) : HIROSHI KINOSHITA

It is certified that error appears in the above-identified patent and that said Letters Patent is hereby corrected as shown below:

Col. 3, line 42, "BEST MODE OF CARRYING OUT THE" should be --DESCRIPTION OF THE PREFERRED EMBODIMENT--;
line 43, "INVENTION" should be deleted;
line 47, "com-" should be deleted;
line 48, "prises" should be --includes--.

Col. 4, line 7, "comprises" should be --includes--;
line 30, "comprising" should be --including--;
line 33, "vided" should be --vided on--;
line 35, "comprising" should be --including--;
line 61, "holes" should be --holes 123a, b--;
line 62, "holes" (first occurrence) should be --holes 124a, b--; and
"holes (second occurrence) should be --holes 125a, b--;
line 63, "holes" should be --holes 126a, b, respectively--.

Col. 5, line 10, "consisting of" should be --including--;
line 18, "is" should be --are--;
line 35, "are" should be --is--;
line 44, "wiretable," should be --worktable,--.

Col. 6, line 16, "166" should be --166,--;
line 17, "another" should be --other--.

Col. 9, line 61, "the presence of liability" should be --a tendency--.

Col. 10, line 50, "(159)" should read -- 150 --.

Col. 11, line 52, "contact" should be --contact 165'a --.

UNITED STATES PATENT AND TRADEMARK OFFICE
CERTIFICATE OF CORRECTION

PATENT NO. : 5,051,553
DATED : SEPTEMBER 24, 1991
INVENTOR(S) : HIROSHI KINOSHITA

It is certified that error appears in the above-identified patent and that said Letters Patent is hereby corrected as shown below:

Col. 12, line 48, "in dependence on" should be --depending upon--.

Col. 14, line 12, after "executed.", insert the following claims:

--7. A method for detecting a failure in automatic wire extension of a wire cut electric discharge machine, comprising the steps of:

generating a predetermined detection output when a short circuit occurs between a wire electrode and a main nozzle during execution of wire extension through a machining initial hole having a small diameter by use of a subnozzle mounted to a main nozzle and electrically insulated therefrom;

disabling the short-circuit detecting circuit to render the predetermined detection output therefrom ineffective after the start of the wire extension until the wire electrode reaches a predetermined delivery position; and determining that the wire extension ended in failure when the predetermined detection output is generated by the short-circuit detecting circuit after the short-circuit detecting circuit is released from a disabled state.

UNITED STATES PATENT AND TRADEMARK OFFICE
CERTIFICATE OF CORRECTION

PATENT NO. : 5,051,553
DATED : SEPTEMBER 24, 1991
INVENTOR(S) : HIROSHI KINOSHITA

It is certified that error appears in the above-identified patent and that said Letters Patent is hereby corrected as shown below:

8. The method according to claim 7, further comprising the steps of:

removing the subnozzle from the main nozzle;

operating the machine to carry out a second wire extension through a machining initial hole having a normal diameter by using the main nozzle;

determining whether the first-mentioned wire extension or said second wire extension is being executed;

generating a second predetermined detection output when a short circuit occurs between the wire electrode and a workpiece during execution of the second wire extension; and determining that the wire extension ended in failure when the second predetermined detection output is generated.--

Signed and Sealed this

Thirtieth Day of March, 1993

*Attest:*

STEPHEN G. KUNIN

*Attesting Officer*     *Acting Commissioner of Patents and Trademarks*